United States Patent [19]

Ardezzone et al.

[11] 3,866,119

[45] Feb. 11, 1975

[54] PROBE HEAD-PROBING MACHINE COUPLING ADAPTOR

[75] Inventors: Frank J. Ardezzone, Santa Clara; Thomas A. Englert, San Jose, both of Calif.

[73] Assignee: Probe Rite, Inc., Santa Clara, Calif.

[22] Filed: Sept. 10, 1973

[21] Appl. No.: 395,429

[52] U.S. Cl............ 324/158 F, 324/72.5, 324/158 P
[51] Int. Cl........................... G01r 31/02, G01r 1/06
[58] Field of Search......... 324/158 F, 158 P, 158 R, 324/72.5

[56] References Cited
UNITED STATES PATENTS
3,728,667  4/1973  Richelmann..................... 324/158 F Primary Examiner—Alfred E. Smith
Assistant Examiner—Ernest F. Karlsen
Attorney, Agent, or Firm—Schatzel & Hamrick

[57] ABSTRACT

Probe head adaptor assembly for mounting a multipoint electrical test probe head with a probing machine to test miniature electronic devices. The mounting adaptor includes a main adaptor ring configured for engagement to a probing machine, a removable ring clamp engageable to the main adaptor ring to secure a multi-point probe head in place within the main adaptor ring, a pin aligning ring within and coaxial with the adaptor ring and carrying a plurality of compressible electrically conductive pins positioned to make interface contact with terminals of said probe head, a transition board positioned coaxially within the aligning ring and carrying a plurality of terminals each of which is electrically coupled to a pin of the aligning ring, a contact board coupled to the aligning ring and coaxial therewith, said contact board carrying a plurality of contact terminals for making electrical contact with terminals of a probing machine and conductive lead wire means interconnecting said contact board terminals with said transition board terminals.

13 Claims, 5 Drawing Figures

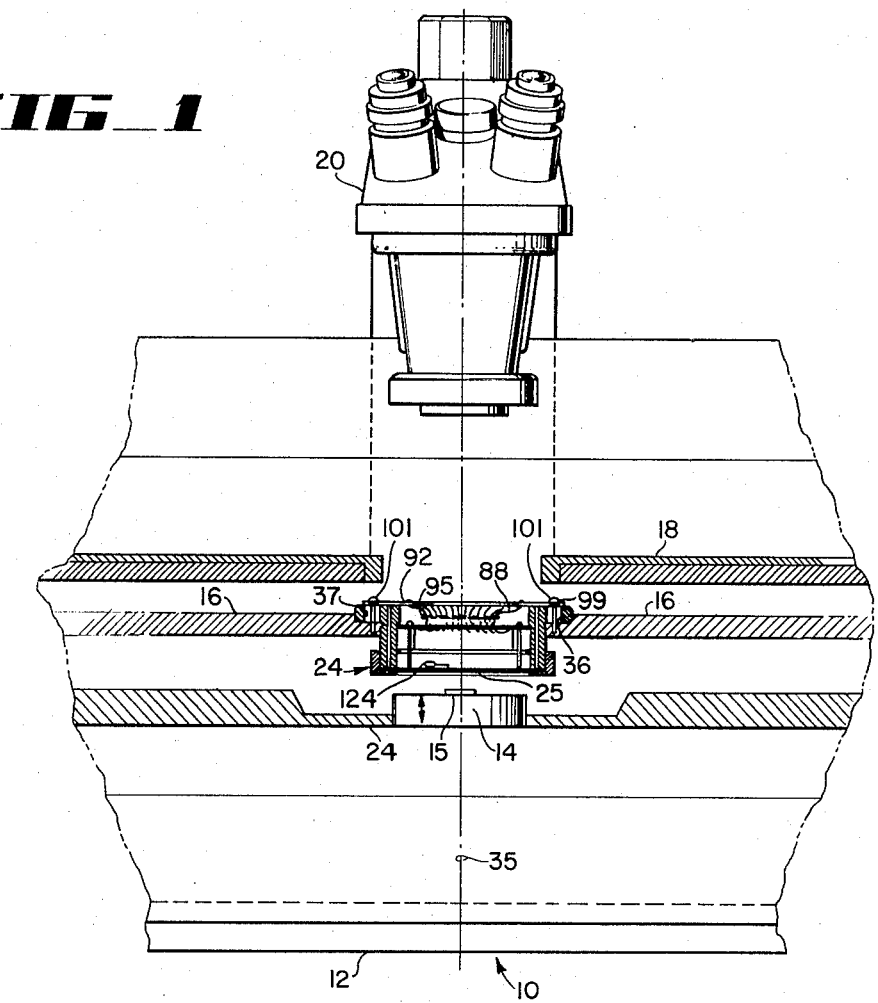
FIG_1
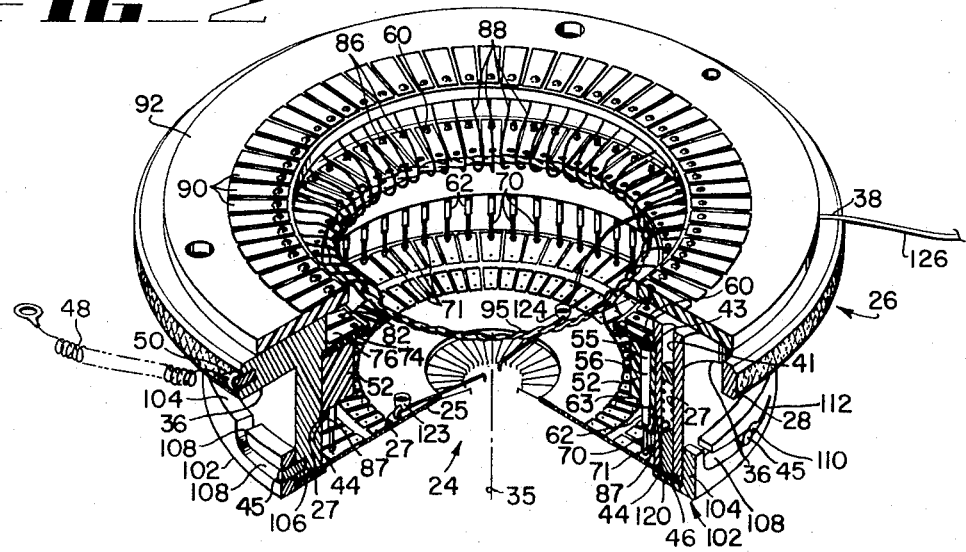
FIG_2

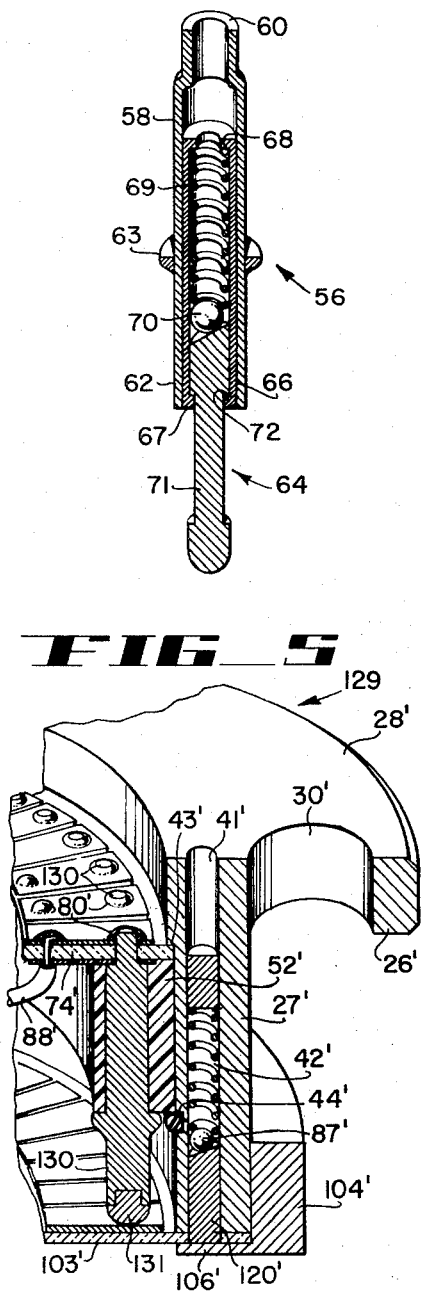
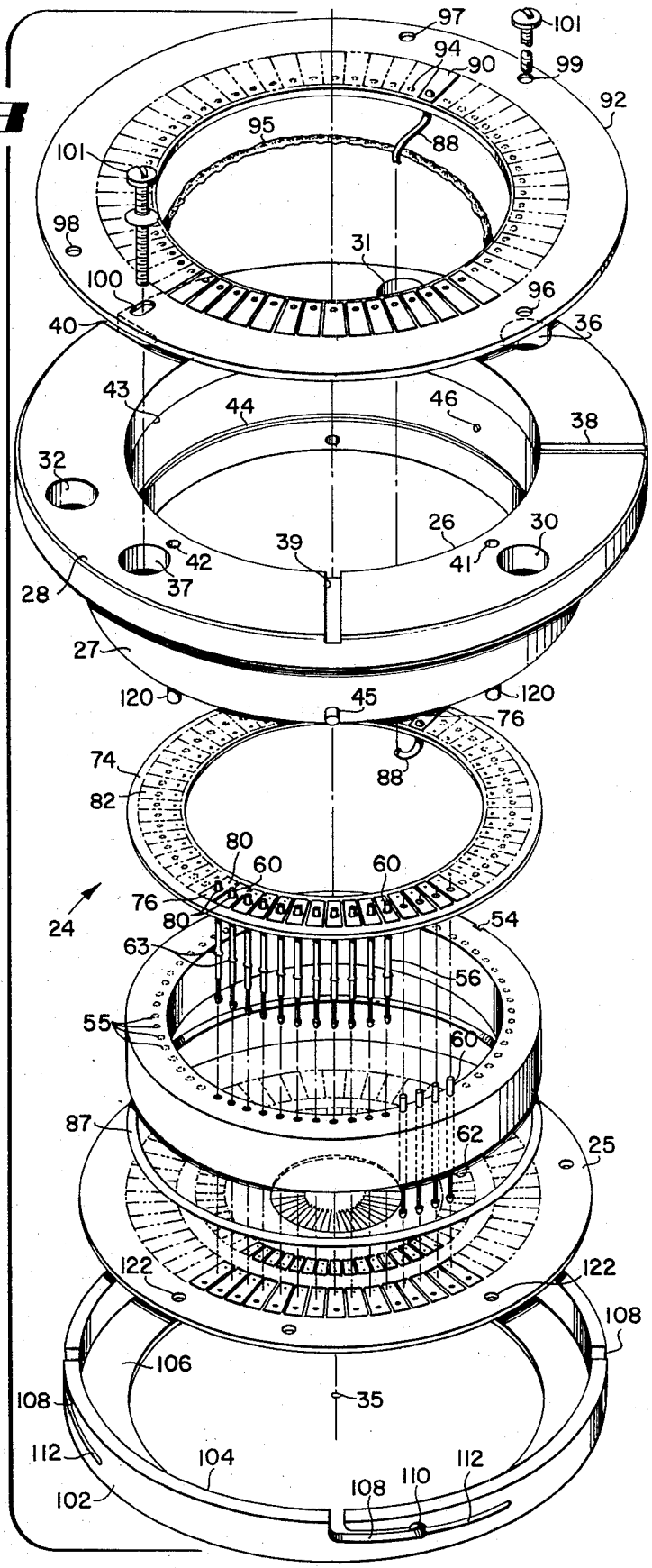

PROBE HEAD-PROBING MACHINE COUPLING ADAPTOR

BACKGROUND OF THE INVENTION

1. Field of the Invention

The present invention relates to test probe cards for making electro-mechanical interface connection between electronic test equipment and electronic devices under test. More particularly, the invention relates to an improved connector adaptor for coupling a multipoint probe test head to a probing machine fixture.

2. Description of the Prior Art

The practice of testing the electrical characteristics of miniature electronic devices, e.g. semiconductor components, integrated circuit components, circuits, etc. is of prime importance to the electronic device manufacturer. It is desirable to determine the performance capabilities and discover defective devices prior to and after assembly of the devices. Thus, in the semiconductor industry, it is a common practice to test semiconductor devices while they are in wafer or slice form so as to eliminate unsatisfactory components prior to the assembly process. The manufacturer also conducts tests of the devices after final assembly and prior to shipment for quality assurance of the shipped product. The end user of the devices commonly conducts further tests of the devices prior to installation of the devices in the equipment in which the device is to become a part. The increasing use of, and market demand for semiconductor devices dictate that the electronics industry provide equipment capable of performing these tests at higher rates of speed with precise accuracy.

Test probe cards have been used for several years and multipoint probe card test head assemblies have been commonly used to provide an electro-mechanical link between the electronic test equipment and the devices under test. Probe cards are used by electronic component manufacturers in conducting performance, good/bad, classification,, continuity, functional and monitoring tests of the devices. The use of probe cards has proven to enhance test procedures by reducing set-up time and further making it practical to test several different families of devices using the same test equipment.

Research and development in the electronic component industry continuously leads to further miniaturization and different varieties of electronic devices. Miniaturization dictates that in the testing operations of semiconductor-type devices, it is desirable to simultaneously test more and more devices positioned on a wafer and more and more pads (terminals) positioned on the device. The high volume demand and the continuing further miniaturization of the devices require smaller pads closely positioned to one another. For example, presently pads of four mils square are commonly used. Pads of two mil square and pads of two mil diameter with one mil space between adjacent pads is becoming more widely used. Also, the increase in varieties of devices dictates that testing apparatus be very versatile.

Accordingly, it is desirable for the interface probe head assembly to provide a probe card with a large number of probe contacts of small size. The relative position of the contacts need be dimensionally accurate to provide for the simultaneous interface contact of the test equipment with a large number of miniature pads.

It is also a prime objective to prevent damage to the metallized pads of the devices during the interface electro-mechanical contact. Various electronic devices carry pads of thin layers of metal thereby demanding extreme care during the interface contact of the pads with the probe contacts to avoid damage to the pads and circuit faces.

To perform the testing operations, the probe head assembly is generally mounted on a machine referred to as a wafer probing machine. The machine functions as an interconnect between external electronic test equipment and the probe head. A wafer or other miniature electronic device to be tested is positioned on a chuck of the machine. In operation, the machine guides the pads of the device relative to the tip contacts of the probe head assembly to make interface engagement of the tip contacts with individual pads. Upon making interface contact, the electronic test equipment, electrically coupled through the probe head assembly, is able to sense and evaluate the electrical characteristics of the device. When testing of the device is complete, the wafer probing machine is indexed to remove the probe tip contacts from interface contact with the pads, the tested device is moved on relative to the probe head assembly and another device to be tested is placed in position on the chuck. The testing operations are then repeated for the newly positioned device. Testing operations are repeated with the same test probe head assembly for a number of devices so long as the format of the tip contacts of the probe head is compatible with the format of the pads of the devices to be tested.

The number, format and spacing of the pads of the electrical devices to be tested vary depending upon the nature of the device. Consequently, various test probe head cards having probes in differing tip formats are provided to accommodate differing devices. The probing machine is generally adapted to accommodate various different probe heads in order to increase the utility of the probing machine and associated test equipment. Thus, when it is desirable to test devices having a terminal format differing from that of the test probe head assembly mounted on the probing machine it is necessary to change the test probe card mounted on the machine. Coupling adaptors are provided to interconnect and remove the test probe head cards from the machine. To preserve man hours, and to increase the value of the probing machine and interconnected test equipment, it is desirable to provide a coupling adaptor which is easily and rapidly manipulated to provide for rapid and easy interchange of probe cards. At the same time it is desirable for the adaptor to provide electro-magnetic interference shielding of the test lines.

SUMMARY OF THE INVENTION

It is a primary object of this invention to provide a coupling adaptor having the capacity of interconnecting a test probe card to a probing machine and which adaptor accommodates probe cards of various tip contact formats.

Another object of the invention is to provide an adaptor coupling which provides for the removal and replacement of probe cards with relative ease and rapidity.

Another object of this invention is to provide an adaptor coupling for eliminating electro-magnetic interference.

These and other objects of the invention are attained in an exemplary embodiment of a coupling adaptor comprising a main adaptor ring adapted for engagement to a probing machine. The main adaptor ring is further adapted for engagement with a ring clamp for securing a multi-point probe card test head in place intermediate the adaptor ring and the clamp with the tip contacts of the test head projecting through the ring clamp to allow for interface contact with a device positioned in alignment beneath the adaptor. A pin alignment ring is positioned coaxially within the interior of the adaptor ring supporting a plurality of compressible electrically conductive pins positioned in alignment such that one end of the pins make frictional interface contact with terminal pads of the probe card test head. A transition board is positioned coaxially within the aligning ring and carries a plurality of terminals each of which is electrically coupled to the other end of the pins of the aligning ring so as to provide electrical coupling between the associated pad of the probe card test head, the electrically conductive pin and the terminal on the transition board. A contact board is in turn coupled to the adaptor ring and coaxial therewith with the contact board carrying a plurality of contact terminals each of which is interconnected with an associated terminal of the transition board. The pattern of the terminals on the contact board are designed to accommodate the pattern of the interconnect leads carried by the probing machine to interconnect test instrumentation.

The ring clamp is adapted to be readily removed and replaced to the adaptor ring such that probe card test heads may be readily removed and replaced from the adaptor.

These and other objects and advantages of the present invention will become apparent to those of ordinary skill in the art after having read the following detailed description of the preferred embodiments which are illustrated in the several figures of the drawings.

BRIEF DESCRIPTION OF THE DRAWINGS

FIG. 1 is a front view of a segment of a probing machine embodying a coupling adaptor of the present invention;

FIG. 2 is a perspective partially sectioned view of the coupling adaptor illustrated in FIG. 1;

FIG. 3 is an exploded view of the coupling adaptor of FIG. 2;

FIG. 4 is a cross-sectional view of an interconnect pin of the adaptor of FIGS. 1–3; and FIG. 5 is a side-elevational cross-sectional view of another embodiment of the coupling adaptor of FIG. 2 with the tip contacts in the form of an elastic electrically conductive material.

DESCRIPTION OF THE PREFERRED EMBODIMENT

FIG. 1 illustrates a segment of a probing machine referred to by the general reference character 10 on which the coupling adaptor of the present invention may be mounted to interconnect a test head probe card with the probing machine. The machine 10 is adapted to vertically orient an electronic device to be tested, e.g. semi-conductor wafer, relative to the tip contacts of the test head assembly and in turn cause electromechanical interface contact between the device and the tip contacts of the test head probe card. The tip contacts are in turn electrically coupled to electronic test equipment (not shown) such that the electrical capabilities of the device may be evaluated. Once the device is tested, it is lowered from interface contact with the tip contacts and transferred out of alignment with the probe head. As the tested device is transferred (stepped) another device is placed in position to be tested.

More specifically, the probing machine 10 incorporates a base 12 with a centrally oriented chuck 14. A device 15 to be tested is positioned on the chuck 14. A mount 16 is provided above the chuck 14 to receive an adaptor to couple a test head probe assembly to the probing machine 10. A microscope 20 is positioned in vertical alignment with the chuck 14 and mount 16 such that when electronic devices are positioned on the chuck 14 the position of the probe tip contacts relative to the pads of the device under test may be viewed and oriented.

In operation, the devices 15 to be tested are positioned on the chuck 14. An individual operating the test station views the probe tip contacts and the device through the microscope assembly 20 to evaluate the positional relationship of the tip contacts and pads. Positional adjustments of the device may be made to assure proper alignment. The apparatus 10 is then actuated to bring the device pads into interface contact with the tip contacts. Upon making interface contact, electrical signals are transmitted to the electrical test equipment (not shown) such that the electrical characteristics of the device under test may be evaluated. An inker assembly, as hereinafter described, may be included and depending upon the test results, the device under test may be marked with ink for classification. For example, if the test results are not satisfactory, the device may be marked with ink for identification and subsequent processing.

A coupling adaptor, referred to by general reference character 24, of the present invention is engaged to the mount 16 to couple a probe test head card 25 to the machine 10. The coupling adaptor 24 as best illustrated in FIGS. 2–4, inclusive, comprises an adaptor ring 26 with a cylindrical side wall 27 and a planar flange 28 engaged about one end. As illustrated in FIG. 1, the bottom side of the flange 28 rests on a lip 29 of the mount 16. A set of three bores 30, 31 and 32 spaced 120° apart extend through the flange with the axis of rotation of each of the bores parallel with the axis of rotation 35 of the ring 26. The bores 30, 31 and 32 are provided to permit access from the top side of ring 26 to adjacent the lip 29. Two diametrically opposed bores 36 and 37 are provided to permit alignment with the mount 16. Intermediate the bores 30 and 36 is a slot 38 and intermediate the bores 30 and 37 is a slot 39. The slots 38 and 39 extend across the entire top surface of the flange 28 radially from the axis 35 to provide a channel for extending lead wires to inkers positioned within the interior of the adaptor 24. An orientation U-shaped slot 40 is formed in the flange 28 at a position intermediate the bores 31 and 32 to receive an adjustment tool. For example, once the adaptor 24 is mounted, radial adjustments about the axis 35 may be made by inserting a tool in the slot 40 and exerting radial pressure against the tool.

The bores 41 and 42 are positioned respectively adjacent the bores 30 and 37 and extend through the side wall 27 to receive resilient aligning members as hereinafter described. A shoulder 43 is formed about the interior wall of the ring 26 at an elevation essentially equivalent to the width of the flange 28. A groove 44 is formed within the interior wall of the ring 26 at a position approximately one-third the height from the bottom terminal end of the ring 26. A set of four locking pins 45 project radially from the exterior of the side wall 27 at an elevational position below the groove 44. An alignment stud 46 (FIG. 3) projects from the side wall 27 toward the interior of the ring 26 to provide for radial alignment of other components as hereinafter described. Engaged about the exterior of the ring 26 is a coiled ground wire 48 (FIG. 2) anchored to the ring by a fastener screw 50. Wire 48 provides an electrical ground path between the adaptor 24 and the probing machine to ground out electro-magnetic interface.

Positioned within the interior wall of the adaptor ring 26 is a cylindrical pin aligning ring 52 comprised of an insulated material, e.g. teflon. The ring 52 fits coaxially within the adaptor ring 26 and is positioned intermediate the shoulder 43 and the groove 44. The ring 52 carries a vertically extending alignment groove 54 to receive the aligning pin 46 of the ring 26 to provide radial alignment of the ring 52 relative to the adaptor ring 26. A plurality of bores 55 project through and are evenly spaced about the ring 52. A resilient interconnect pin 56 is positioned in each of the bores 55. The pins 56, illustrated in an enlarged cross-sectional view in FIG. 4 are in the form of spring loaded pogo pins each having a cylindrical sleeve 58 embedded in the bores 55. Each sleeve 58 has a positionally fixed portion 60 projecting from one end surface of the ring 52 and a second positionally fixed portion 62 projecting from the other terminal end of the ring 52. A shoulder 63 is formed intermediate the portions 60 and 62 which abutts with the bottom planar face of the ring 52 about the bores 55. Within the interior of the sleeve 58 and projecting from the portion 62 is a pogo pin assembly 64 having a sleeve 66 which fits within the interior of the positionally fixed portion 62 of the sleeve 58. The sleeve 66 forms a shoulder 67 about one terminal end and a shoulder 68 about the other terminal end. A coil spring 69 is within the interior of the sleeve 66 and engages a ball 70 in turn abutting a tapered terminal end of a pogo pin 71. The pin 71 has a shoulder 72. The spring 69 is biased to continuously urge the ball 70 and pin 71 from the interior of the sleeve 66. The interengagement of the shoulders 67 and 72 limits the maximum projection of the pin 71 from the sleeve 66. The tapered end of the pin is such that the ball 70 and the side of the pin 71 are continuously in contact with the side wall of the sleeve 66 thereby enhancing the electrical continuity between the pin 71 and sleeve 58.

Engaged about the top planar side of the aligning ring 52 is a planar transition printed circuit board ring 74. The ring 74 is comprised of a fibreglass material with copper clad terminals 76 positioned on the top and bottom sides in mating alignment. The mated terminals 76 are interconnected by means of a pair of bores 80 and 82. In position, the transition ring 74 engages the top surface of the pin aligning ring 52 with each of the apertures 82 receiving the fixed portion 60 of one of the sleeves 58. The transition board ring 74 in position has the top surface in abuttment with the shoulder 43 and the bottom side surface in abuttment with the top surface of the ring 52 with each of the pin portions 62 projecting through the apertures 82. Each of the terminals 76 is electrically and mechanically connected to the fixed pin portions 60 by a bead of solder 86. The board 74 and the ring 52 are integrally locked in place within the aligning ring 26 by an O-ring 87 fitted within the groove 44 and abutting the bottom edge of the ring 52.

Connected to each of the apertures 82 of the transition board 74 is an interconnect wire 88 which terminates on a pad 90 of a fuzz button contact board 92 positioned about the top side of the adaptor ring 26. The fuzz button contact board 92 includes a ring of fibreglass board with a plurality of the pads 90 positioned on the top side surface thereof. An aperture 94 extends through the board 92 to each of the pads 90 to allow the wires 88 to project therethrough and be soldered to the pads 90. Accordingly, each of the wires 88 electrically interconnect one of the pads 90 with one of the pins 56 of the aligning ring 52. The wires 88 are retained in spaced apart relationship by means of an elastic band 95 which fits about the inside of each of the wires 88 and applies a pressure to hold each of the wires in place. The board 92 carries three smooth surface bores 96, 97 and 98 respectively in coaxial alignment with the bores 30, 31 and 32 of the adaptor ring 26. Two diametrically opposed bores 99 and 100 are positioned for coaxial alignment with the bores 36 and 37 of the ring 26. As illustrated in FIG. 1, fastener bolts 101 with bell ring washers project through the apertures 99 and 100 of board 92 and bores 36 and 37 of the flange 28. The bolts 101 thread within the lip 29 of mount 16. The bolts 101 are of substantially less diameter than bores 36 and 37 to permit angular adjustments of the board 92 relative to the ring 26.

Engaged about the bottom terminal end of the adaptor ring 26 is a clamping ring 102 to clamp the probe head test card assembly 25 in the adaptor coupling assembly 24. Clamping ring 102 forms an outer cylindrical side wall 104 of which the exterior surface is knurled. The wall 104 is engaged at right angles to an end wall segment 106 in the form of a planar disc ring. A set of four L-shaped grooves 108 are formed in the side wall 104 with each opening to the face of the clamping ring. The openings of the grooves 108 are spaced at 90° increments relative to one another about the axis of rotation 35. The grooves 108 are adapted to simultaneously receive the aligning pins 45 projecting from the ring 26. The width of the opening of each of the grooves 108 is equal to or slightly greater than the diameter of the pin 45 such that the pins may be readily inserted in the grooves. The main leg portion of each of the grooves 108 is on an angular decline extending from the opening to an enlarged oblong-shaped seat 110. The major diameter of the seat 110 is equivalent to the diameter of the aligning pins 45. Each groove 108 further extends to a slit 112 extending beyond the circular seat. The slit 112 provides for some resiliency in the side wall portions of the side walls 104 within the region of the grooves 108 such that as the ring 102 is rotated with the aligning pins 45 in the grooves 108, the walls may expand slightly while simultaneously applying pressure on the aligning ring. When the ring 102 is rotated such that the pins 45 are within the seats 110, the tensioned wall portions 104 spring back to their natural position.

The planar circular probe head test card 25 carrying the probe tip contacts is inserted intermediate the end wall of the adaptor ring 26 and the end wall 106 of the clamping ring 102. As the clamp ring 102 is rotated with the pins 45 in the grooves 108, it assumes a spiral path about the axis 35. The wall 106 applies pressure against the bottom side of the probe card and sandwiches the card intermediate the adaptor ring 26 and the clamp ring 102. In position, each of the individual terminal pads on the probe card 25 are frictionally engaged by one of the pogo pin contact terminals 71 supported by aligning ring 52. In view of the fact that each of the pogo pin assemblies 64 are resilient in a vertical direction, each pogo pin 70 makes electro-mechanical interface contact with one of the pads on the probe point head even though the pads are not necessarily all of the same elevation, i.e. planar. At the same time, the pressure applied by the pogo tip assemblies 64 against the pads assures good electrical interface contact between the pads and the pogo tip contacts 71.

To provide radial alignment stability of the probe head test card 25 with the adaptor ring 24 while the clamping ring is being rotated, an aligning pogo pin 120 is inserted within each of the two bores 41 and 42 of the side wall 27 of the adaptor ring 24. The pogo pins 120 project from the lower terminal end wall 106 when the clamp 102 is engaged to the locking pins 45 thereby further insuring a common electrical ground path for the ring 104.

The probe head test card assembly 25 may support electromechanical inkers 123 and 124 as previously indicated. Electrical leads 127 and 128 extending therefrom. The electrical leads 127 and 128 are guided to the exterior of the adaptor assembly through the slots 38 and 39 in the top surface of the flange 26. Accordingly, the inkers 122 and 123 may be actuated from the exterior to mark devices with ink during the testing operations.

When it is desired to remove the test card 25, the clamping ring 102 is turned and disengaged from the locking pins 45. The card 25 may then be removed and replaced with another probe card 25 of a differing tip-contact format if desired.

FIG. 5 illustrates an embodiment 129 of the coupling adaptor wherein the tip contacts engaged to the adaptor ring are in the form of a resilient contact material positioned about the terminal ends of the interconnect sleeves. For purposes of clarity, the component parts of the embodiment 129 similar to those components previously described in connection with the embodiment 24, reference numeral distinguished by a prime designation. As illustrated, the aligning ring 52 carries a plurality of electrically conductive pins 130. Secured about the terminal end of each pin 130 is a tip contact 131. The tip contacts 131 are of a resilient material comprising electrically conductive particles. The contact material is described in detail in co-pending patent application Serial No. 201,098 by the present inventor. The contact material may include silver and rhodium particles suspended in a silicon rubber base material. The silver particles provide for high conductivity and the rhodium particles serve as a low oxidizing contact material which in granular form provides sharp corners. The sharp corners facilitate microscopic piercing of the aluminum oxide layer of the pad area of the probe head test card to facilitate the electrical interface contact of the tip contacts 131 with the pads of the card. The silicon rubber base possess elastic properties permitting the tip contact to absorb flexure upon making interface contact with the pads of the test probe head. As the pressure between the pads and tip contacts 131 increase, the tip contacts spread outward thereby increasing the interface contact area between the tip contact and pad without there being any horizontal sliding of the tip contacts. Upon releasing or relieving the interface pressure, the tip contacts reassume their original shape. While providence the elasticity, the silicon rubber base also protects the conductive particles from the atmosphere thereby preventing oxidation of the conductive particles. Exemplary mixtures for the tip contacts 131 include rhodium particles of 12 to 15 microns, silver particles of 5 to 70 microns, and silicon rubber of a durtameter rating in the range of 15 to 30. Exemplary tips may assume a diameter-to-height ratio in the approximate order to two-to-one with the diameter being approximately in the order of 0.004 inch and the height approximately the order of 0.002 inch, although tips in the order of 0.01 inch height with a base diameter of 0.005 inch have been used. Probe tips and circuit pads, with present technology can readily be structured to an accuracy of plus or minus 0.0002 inch. At the same time, good electrical contact is realized with a travel override of approximately 0.001 inch from the point of initial contact of the tip and pad. Accordingly, flexure of the tips 131 may be in the order of 0.0005 to 0.003 inch to assure good interface contact of all interconnect tip contacts 131 with the pads on the probe head. Besides providing for the decided flexure, the tip material preferably possess low oxidation rates or high resistance to oxidation and high conductivity, i.e. low contact resistance and low internal resistance, to assure accurate test results. The material exhibits high resistance to wear and good physical and electrical stability so as to permit ti to be repeatedly used over an extended life without a significant alteration in its physical and electrical properties.

Although preferred embodiments of the present invention have been disclosed hereinabove, it is contemplated that various modifications of the invention will become apparent to those skilled in the art after having read the foregoing description. Accordingly, it is intended that the description not be considered limiting, and that the appended claims be interpreted to cover all alterations and modifications which fall within the true spirit and scope of the invention.

What is claimed is:

1. Probe head adaptor assembly for coupling a probing machine to a head test card for testing electronic devices, the adaptor comprising an adaptor ring member with means for mounting on a probing machine and forming a first cylindrical wall;

a pin aligning ring member positioned coaxially within the interior of the first cylindrical wall, a plurality of conductive resilient pin members supported by the aligning ring with the tip contacts of the pin members projecting from one terminal end of the aligning ring, said tip contacts establishing a predetermined pattern to correspond with the terminal pad pattern of a probe head test card to be interconnected, each of said pin members being deflectable along a plane parallel with the axis of the aligning ring;

a clamping ring member forming an internal seat for receiving a probe head test card and supporting the card in a plane normal to the axis of the pin aligning ring, the clamping ring being interlockable with the adaptor ring with the probe head test card sandwiched intermediate the adaptor ring and the clamping ring with each of the terminal pads of the card abutting at least one of said pin members to form a common electrical path between said pads and said abutting pin members; and transition means engaged about the other terminal end of the pin aligning ring for electrically interconnecting the pin members to exterior test equipment.

2. The adaptor assembly of claim 1 wherein the transition means includes a printed circuit board ring coaxial with the pin aligning ring, the board ring carrying a plurality of individual transition terminal pads spaced apart about the transition board ring and each electrically joined to one of the pin members about the other terminal end of the pin aligning ring, and interconnect leads extending from each of said transition terminal pads for electrically interconnecting said pads with exterior test equipment.

3. The adaptor assembly of claim 2 wherein the transition means further includes a planar contact board supported about one terminal end of the adaptor ring in axial alignment with the transition board ring, said contact board carrying a plurality of individual spaced-apart contact terminal pads, each of said contact terminal pads of the contact board being interconnected to pads of the transition board ring by said interconnect leads.

4. The adaptor assembly of claim 3 wherein the adaptor ring carries a plurality of interlock pins projecting from the exterior of the first cylindrical wall at positions adjacent the other terminal end; and the clamping ring forms a cylindrical side wall of an internal diameter substantially equivalent to the external diameter of the first cylindrical wall to permit the clamping ring to fit over the adaptor ring, a plurality of grooves formed in the side walls of the clamping ring, said grooves opening to the face of the clamping ring to receive the locking pins of the adaptor ring and securing the clamping ring to the adaptor ring.

5. The adaptor assembly of claim 4 wherein the clamping ring includes a planar circular disc ring coaxial with the adaptor ring and engaged at right angles to the cylindrical side wall to form a seat for supporting a cylindrical probe head test card coaxial with the pin aligning ring.

6. The adaptor assembly of claim 5 wherein the resilient pin members project from the other end of the adaptor ring each in alignment with one of the pads of the transition board ring.

7. The adaptor assembly of claim 6 wherein a shoulder is formed about the interior of the first cylindrical wall intermediate the terminal ends thereof, the innermost diameter of the first cylindrical wall formed about the shoulder being substantially equal to the outer most diameter of the pin aligning ring and the transition board ring to permit the pin aligning ring and the transition board ring to be positioned within the first cylindrical wall, the transition board ring being positioned in abutment with the bottom planar surface of the transition board ring, a groove is formed in the interior of the cylindrical wall adjacent the other end of the pin aligning ring, an O-ring positioned in said groove and in abutment with said other terminal end of the aligning ring to secure said aligning ring in place in abutment with the transition board ring.

8. The adapter assembly of claim 6 wherein the resilient pin terminals each include a conductive cylindrical sleeve embedded in the aligning ring and projecting end-to-end of the pin aligning ring, a coil spring within each of the sleeves with each coil spring engaged to a conductive longitudinal pin projecting from the lower terminal end of the sleeve in alignment with the disc ring of the clamping ring.

9. The adaptor assembly of claim 8 wherein a conductive spherical member is positioned within each of said sleeves in contact with the coil spring and one terminal end of longitudinal pin associated with sleeve, the terminal end of the longitudinal pin in engagement with the sphere being tapered such that the spring and sphere continuously urge the pin outward from the sleeve and laterally in the sleeve such that longitudinal pin is in abutting engagement with the sleeve.

10. The adaptor assembly of claim 6 wherein the adaptor forms a flange for engaging the adaptor ring to a probing machine, and the flange carries a groove extending from the interior of the adaptor ring to the exterior of the adaptor ring to receive lead lines coupled to an inker positioned on the probe head test card.

11. The adaptor assembly of claim 10 wherein the flange further carries an alignment groove means; and the planar contact board carries an alignment groove means to co-act with the alignment groove means of the flange to align the planar contact board relative to the adaptor ring member.

12. The adaptor assembly of claim 11 wherein the flange carries a tool receiving slot to receive an alignment tool to make adjustments of the angular position of the adaptor ring.

13. The adaptor assembly of claim 6 wherein a resilient alignment pin projects from the bottom terminal face of the first cylindrical wall in alignment with said planar disc ring, said resilient alignment pin being adapted to project through an aligning aperture in the probe head test card to match the angular alignment of the first cylindrical wall with the probe head test.

* * * * *